United States Patent
Bhogal et al.

(10) Patent No.: US 9,785,537 B2
(45) Date of Patent: Oct. 10, 2017

(54) RUNTIME EXCEPTION AND BUG IDENTIFICATION WITHIN AN INTEGRATED DEVELOPMENT ENVIRONMENT

(71) Applicant: International Business Machines Corporation, Armonk, NY (US)

(72) Inventors: Kulvir S. Bhogal, Fort Worth, TX (US); Lisa Seacat DeLuca, Baltimore, MD (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/883,662

(22) Filed: Oct. 15, 2015

(65) Prior Publication Data

US 2017/0109256 A1  Apr. 20, 2017

(51) Int. Cl.
*G06F 9/44* (2006.01)
*G06F 11/36* (2006.01)

(52) U.S. Cl.
CPC ...... *G06F 11/3636* (2013.01); *G06F 11/3612* (2013.01); *G06F 11/3664* (2013.01)

(58) Field of Classification Search
USPC .................. 717/124, 125, 127, 128
See application file for complete search history.

(56) References Cited

U.S. PATENT DOCUMENTS 7,216,336 B1 * 5/2007 Ezra ..................... G06F 11/3624
714/E11.207
7,627,857 B2 * 12/2009 Rokosz ............... G06F 11/3664
714/37
(Continued)

FOREIGN PATENT DOCUMENTS

JP    2004355072 A    12/2004

OTHER PUBLICATIONS

NPL—StackOverflow—IDE—Can Eclipse refresh resource automatically—2011, Located at : http://stackoverflow.com/questions/1212633/can-eclipse-refresh-resources-automatically 2011.*

(Continued)

*Primary Examiner* — Wei Zhen
*Assistant Examiner* — Hossain Morshed
(74) *Attorney, Agent, or Firm* — Cantor Colburn LLP; Kurt Goudy

(57) ABSTRACT

In one embodiment, a computer-implemented method includes monitoring one or more data sources resulting from execution of one or more program components. One or more events are encountered in the one or more data sources during the execution of the one or more program components. One or more messages are generated, with each message describing an event encountered. Each of the one or more messages is parsed for a name of a corresponding source file in which an associated event was encountered, a corresponding line number at which the event was encountered, and at least one of: a timestamp, severity level, full stack trace, category of the event, and summary of the event. The one or more messages are notified of within an integrated development environment (IDE). Each of the one or more messages is associated in the IDE with the corresponding source file at the corresponding line number.

10 Claims, 5 Drawing Sheets

(56) References Cited

U.S. PATENT DOCUMENTS

| | | | | |
|---|---|---|---|---|
| 7,685,570 | B2* | 3/2010 | Draine | G06F 11/3664 715/715 |
| 8,122,366 | B2* | 2/2012 | Harrold | G06F 8/33 715/762 |
| 2004/0164961 | A1* | 8/2004 | Bal | G06F 17/30893 345/163 |
| 2005/0246690 | A1* | 11/2005 | Horton | G06F 11/3664 717/125 |
| 2007/0016429 | A1* | 1/2007 | Bournas | G06F 8/20 700/91 |
| 2007/0021955 | A1* | 1/2007 | Tolone | G06F 17/5004 703/22 |
| 2009/0282342 | A1* | 11/2009 | Fabris | G06Q 10/02 715/733 |
| 2013/0081065 | A1* | 3/2013 | Sharan | G06F 11/3006 719/318 |
| 2014/0033183 | A1* | 1/2014 | Brown | G06F 11/3636 717/131 |
| 2015/0106790 | A1* | 4/2015 | Bigwood | G06F 11/3624 717/127 |

OTHER PUBLICATIONS

NPL-Rubin-Linux Debugger Dr Dobb's—2013, Located at http://www.drdobbs.com/testing/13-linux-debuggers-for-c-reviewed/240156817, 2013.*

NPL-Pasero-Tracking Work Item Changes in Rational Team Concert—2012, Located at: https://jazz.net/library/article/128.*

NPL-MSDN—Event Logging and Viewing—Jan. 2015, Located at: https://msdn.microsoft.com/en-us/library/bb726966.aspx Captured on Jan. 2015.*

MSDN, "Event Logging and Viewing", Jan. 2015, located at https://msdn.microsoft.com/en-us/library/bb726966.aspx.*

Martina Seps, "JAVA Compilation and Error Visualization Support for Envision", Bachelor Thesis Description; Advisor: Dimitar Asenov, 2013, 2 pgs.

Kulvir S. Bhogal, et al., Pending U.S. Appl. No. 14/953,460 entitled "Runtime Exception and Bug Identification Within an Integrated Development Environment," filed with the U.S. Patent and Trademark Office on Nov. 3, 2015.

List of IBM Patents or Patent Applications Treated as Related; (Appendix P), Filed Feb. 17, 2016, 2 pages.

* cited by examiner

FIG. 2B

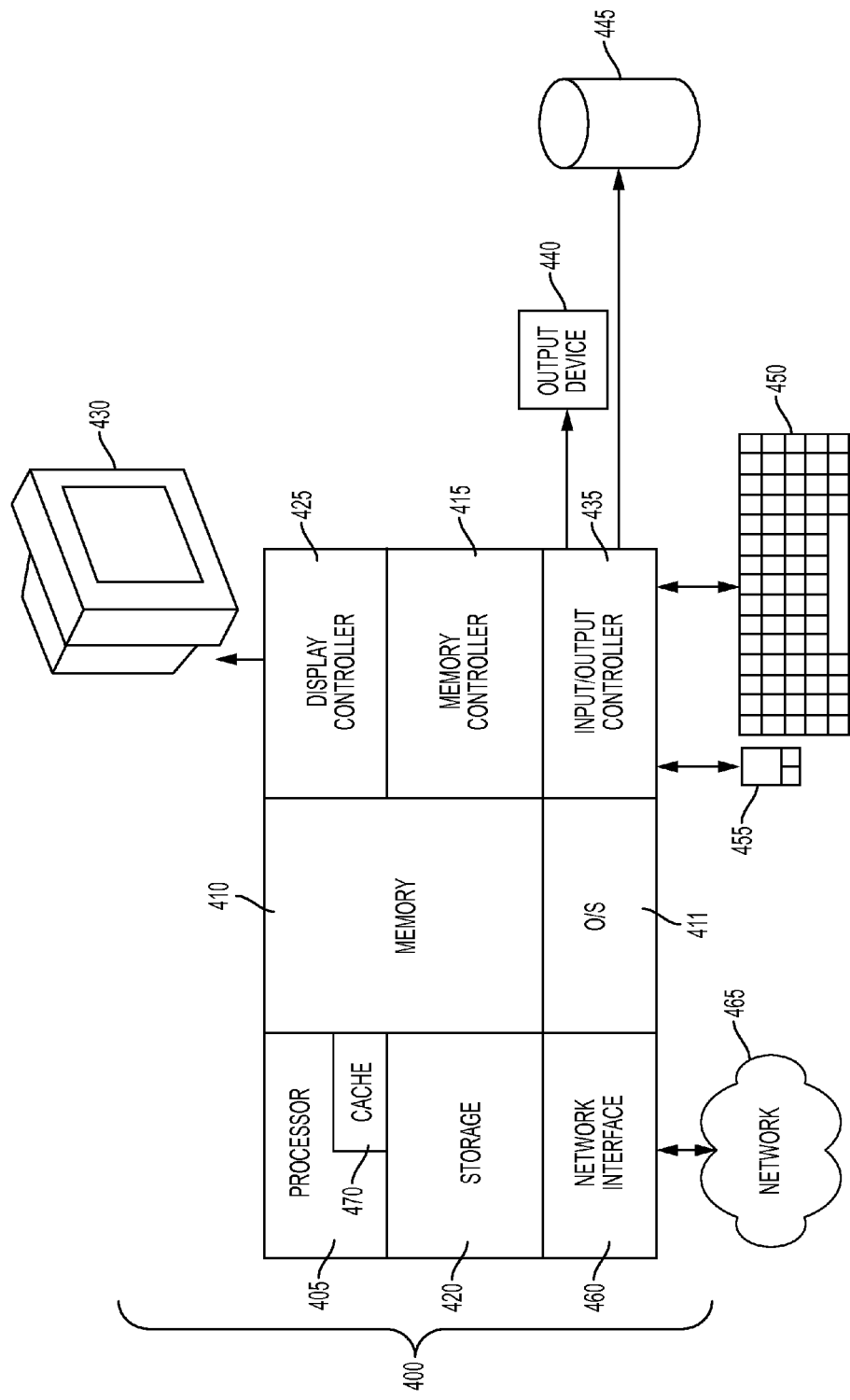

RUNTIME EXCEPTION AND BUG IDENTIFICATION WITHIN AN INTEGRATED DEVELOPMENT ENVIRONMENT

BACKGROUND

Embodiments of the present invention relate to debugging and, more specifically, to runtime exception and bug identification within an integrated development environment.

In software development, it is not always intuitive to determine the root cause of an error. Stack traces provide a chain of code that has been executed across an associated program code, but this information is sometimes not enough for a developer to determine the root cause of a problem. Oftentimes, developers are forced to watch console logs while running a section of code to determine why errors are caused, and this can be a time-intensive and inconvenient task.

SUMMARY

According to an embodiment of this disclosure, a computer-implemented method includes monitoring one or more data sources resulting from execution of one or more program components. One or more events are encountered in the one or more data sources during the execution of the one or more program components. One or more messages are generated, with each message describing an event encountered, responsive to encountering the one or more events in the one or more data sources. Each of the one or more messages is parsed, by a computer processor, for a name of a corresponding source file in which an associated event was encountered, a corresponding line number at which the event was encountered, and at least one of: a timestamp, a severity level, a full stack trace, a category of the event, and a summary of the event. The one or more messages are notified of within an integrated development environment (IDE). Each of the one or more messages is associated in the IDE with the corresponding source file at the corresponding line number.

In another embodiment, a system includes a memory and one or more computer processors communicatively coupled to the memory. The one or more computer processors are configured to monitor one or more data sources resulting from execution of one or more program components. The one or more computer processors are further configured to encounter one or more events in the one or more data sources during the execution of the one or more program components. The one or more computer processors are further configured to generate one or more messages, each message describing an event encountered, responsive to encountering the one or more events in the one or more data sources. The one or more computer processors are further configured to parse each of the one or more messages for a name of a corresponding source file in which an associated event was encountered, a corresponding line number at which the event was encountered, and at least one of: a timestamp, a severity level, a full stack trace, a category of the event, and a summary of the event. The one or more computer processors are further configured to notify of the one or more messages within an integrated development environment (IDE). Each of the one or more messages is associated in the IDE with the corresponding source file at the corresponding line number.

In yet another embodiment, a computer program product for notifying of events encountered in program components includes a computer readable storage medium having program instructions embodied therewith. The program instructions are executable by a processor to cause the processor to perform a method. The method includes monitoring one or more data sources resulting from execution of one or more program components. One or more events are encountered in the one or more data sources during the execution of the one or more program components. Further according to the method, one or more messages are generated, with each message describing an event encountered, responsive to encountering the one or more events in the one or more data sources. Each of the one or more messages is parsed for a name of a corresponding source file in which an associated event was encountered, a corresponding line number at which the event was encountered, and at least one of: a timestamp, a severity level, a full stack trace, a category of the event, and a summary of the event. The one or more messages are notified of within an integrated development environment (IDE). Each of the one or more messages is associated in the IDE with the corresponding source file at the corresponding line number.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 2A-2B are a mockup of an integrated development environment using the notification system, according to some embodiments of this disclosure;

FIG. 4 is a block diagram of a computer system for implementing some or all aspects of the notification system, according to some embodiments of this disclosure.

DETAILED DESCRIPTION

Various embodiments of this disclosure provide visual notifications in an integrated development environment (IDE), notifying a user of runtime exceptions and bugs, and thus enabling the user to easily view and examine information related to runtime exceptions and bugs.

In some embodiments, a notification system according to this disclosure utilizes historical stack trace data and console output to display contextual exception information within the IDE. Because the notification system uses historical data, if program code is run subsequently in the future, the notification system may cumulatively update the user interface of the IDE to indicate the runtime exceptions and bugs.

Figure 1:
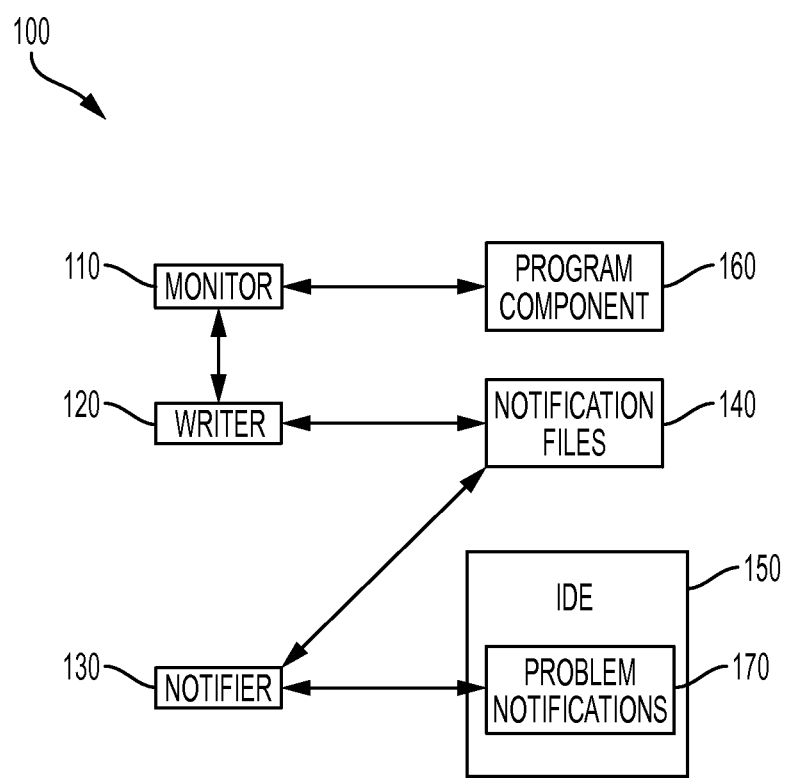
FIG. 1 is a block diagram of a notification system, according to some embodiments of this disclosure.

FIG. 1 is a block diagram of a notification system 100, according to some embodiments of this disclosure. As shown, the notification system 100 may include a monitor 110, a writer 120, a notifier 130, and one or more notification files 140, and the notification system 100 may be in communication with an IDE 150. The monitor 110, writer 120, and notifier 130 may include hardware, software, or a combination of both. Although the monitor 110, writer 120, and notifier 130 are illustrated in FIG. 1 as being distinct components, it will be understood that this distinction is for illustrative purposes only, and that the monitor 110, writer 120, and notifier 130 may share hardware, software, or both. In some embodiments, the notification system 100 is integrated with the IDE 150, while in other embodiments, at least part of the notification system 100 is distinct from the IDE 150 but in communication with the IDE 150.

The monitor 110 monitors one or more program components 160 that include program code. These program components 160 may include, for example, methods, classes, projects, or streams. In some embodiments, a user can activate the monitor 110 for one or more particular program components 160 for which the user desires to see notifications. In that case, the monitor 110 may monitor only the program components 160 for which the monitor 110 is active.

The program components 160 may be executed locally, remotely, or a combination of both. While the program components 160 execute, the monitor 110 monitors the program components 160 for which it is active. Specifically, to implement the monitoring, the monitor 110 may analyze one or more data sources resulting from execution of the monitored components. These data sources may be, for example, stack traces or console output, or both, of the monitored components. During this analysis, the monitor 110 may search the text for events, such as runtime exceptions, bugs, other problems, or other events of note. In some embodiments, this searching includes searching for specific wording used to indicate the existence of a runtime exception, bug, other problem, or other event.

Based on the monitoring, the monitor 110 may generate a message each time it encounters an event within the program components 160 being monitored. For example, the monitor 110 may identify an event in a stack trace or console output, and the monitor 110 may in turn generate a message describing the event. Each message may include, for example, a timestamp, a severity level, a partial or full stack trace, a category of the event, a summary of the event, or a combination of these or other information. The severity level may describe the severity of the event in a language understood and interpretable by the notification system 100. For example, and not by way of limitation, there may exist a predetermined set of severity levels (e.g., warning, log, debug, error), and the severity level in the message may indicate one of such levels. The partial or full stack trace may provide a context for the event by describing the operations surrounding the event's occurrence. The category of the event may be a selection of one or more categories available in a set of predetermined event categories (e.g., null pointer exception). The summary may describe the event in a language understood and interpretable by the notification system 100. It will be understood, however, that additional or alternative information may be included in the message.

Each message generated by the monitor 110 may be written to an applicable notification file 140, and in some embodiments, this writing is performed by the writer 120. In some embodiments, the notification system 100 has a notification file 140 corresponding to each program component 160 for which the monitor is active. Alternatively, however, messages for various program components 160 may be stored in a single notification file 140, and that notification file 140 may be organized such that each message is associated with a reference to its corresponding program component 160 within the notification file 140. When a message is generated based on the monitoring of a particular component 160, that message may then be written to the applicable notification file 140. A timestamp corresponding to the time of the message may also be written to the notification file 140 and associated therein with the message. Further, in some embodiments, a counter is associated with each program component 160, and that counter may be incremented upon generation of a message describing an event related to that program component.

The various notification files 140 may be stored locally or remotely, and in some embodiments, the notification files 140 are shared among members of a group. For example, and not by way of limitation, Rational Team Concert™ may be used for this sharing. Thus, multiple users of a single developer team may all see notifications based on the same set of notification files 140.

In some embodiments, the notifier 130 is in communication with or integrated with the IDE 150. Through the IDE 150, the notifier 130 may provide event notifications 170, which may be notifications of events encountered, or notifications of messages that are based on events encountered. Thus, when a developer interacts with the IDE, the developer may view these event notifications 170 and, in some embodiments, may interact with the event notifications 170 to view more details.

Figure 2A:
Figure 2B:
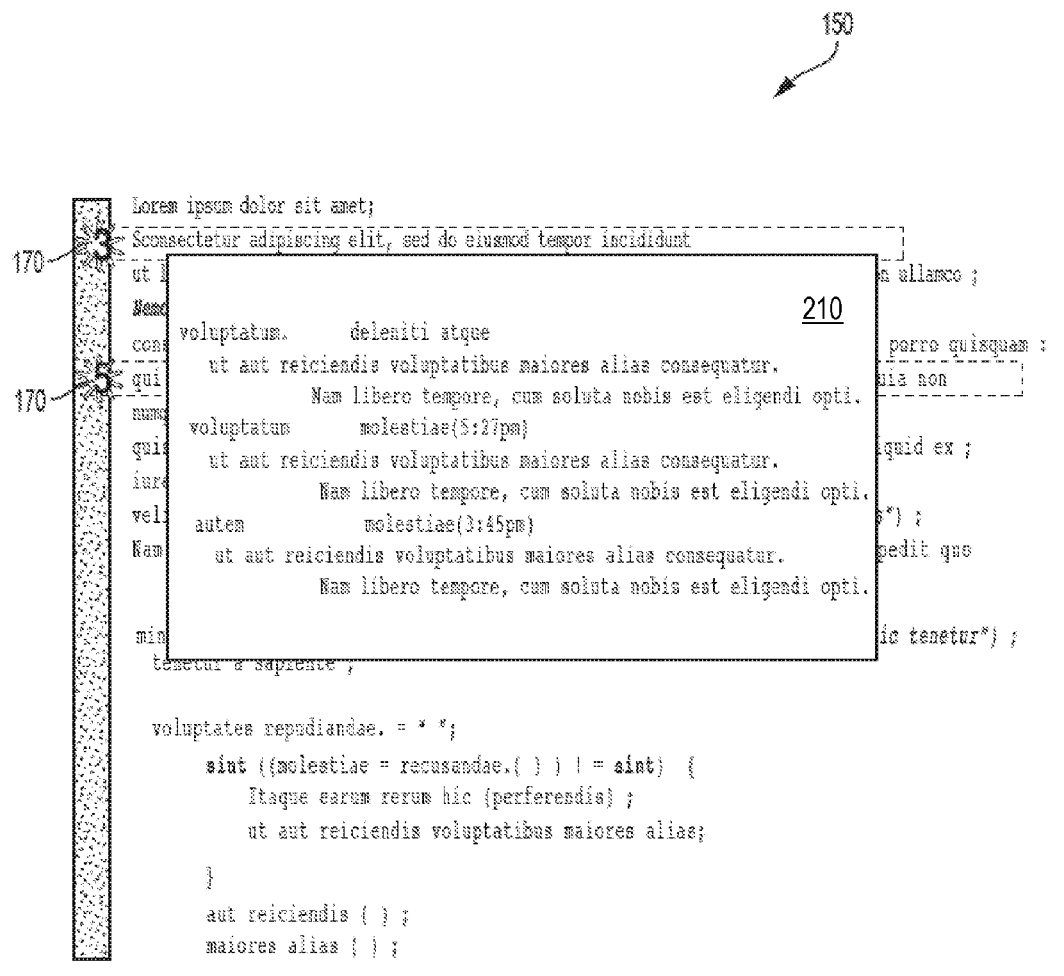

FIGS. 2A-2B are a mockup of an IDE 150, receiving notifications through the notification system 100, according to some embodiments of this disclosure. It will be understood that this mockup is an example provided only for illustrative purposes, and does not limit the various embodiments of the notification system 100. As shown in FIG. 2A, within the IDE 150, the notifier 130 may provide event notifications 170, which may be visual notifications of the events identified during execution of the various program components 160 being monitored. Further, as shown in FIG. 2B, when an event notification 170 is selected by a user, a message 210 associated with the event notification 170 may be displayed in the IDE 150, in part or in full.

The IDE 150 may display a visual representation of each program component 160. In some embodiments, the notifier 130 displays an event notification 170 associated with each program component 160 that is associated with a counter having a value greater than zero. In other words, if one or more messages 210 exist in the applicable notification file 140 for a program component 160, then an event notification 170 may be provided for that program component 160. This event notification 170 may be positioned next to, or otherwise proximate, the IDE's visual representation of the associated program component 160, so as to indicate to a user that the event notification 170 related to the program component 160. Each event notification 170 may notify of at least one message 210, and of at least one event encountered that led to the message 210 being generated, during execution of an associated program component 160.

To provide the event notifications 170, the notifier 130 may parse the messages 210 in the notification files 140. During the parsing, for each message 210, the notifier 130 may identify the timestamp, the severity level, the partial or full stack trace, the category of the associated event, the summary of the event, or a combination of these or other information as provided in the message 210. Some or all of this data identified in the message 210 may be encapsulated into the associated event notification 170.

An event notification 170 may take various forms. For example, and not by way of limitation, the event notification 170 may be a colored highlighting of the visual representation of the associated program component 160, an icon positioned proximate the visual representation of the program component 160, a number equal to the value of the counter of the program component 160, or a combination of these. For further example, in some embodiments such as that shown in FIGS. 2A-2B, the event notification 170 is an icon that includes a numerical value, which is equal to the value of the counter. In some embodiments, the event notification 170 is sized based on the value of the applicable counter, such that a greater counter value translates into a larger event notification 170, and a smaller counter value translates into a smaller event notification 170.

In some embodiments, when the notification system 100 displays an event notification 170 associated with a particular line of code of a program component 160, the notification system 100 may include in the event notification 170 a count of the number of events encountered specifically at that line of code. Thus, in the case where events were encountered at multiple different line numbers within a program component 160, the numerical value displayed in association with the event notification 170 need not equal the full value of the counter for the program component 160; rather, the value displayed may be a smaller value of the count associated only with the line in question.

When displaying a stack trace, an IDE 150 can traditionally also display line numbers for the code of a program component 160. In some embodiments, when the IDE 150 displays a stack trace, the notifier 130 may further include in the IDE 150 an event notification 170 displayed in association with (e.g., proximate to) the line number where an event was encountered.

An event notification 170 may be selectable. When a user selects the event notification 170 for a particular program component 160, the IDE 150 may display contents of the notification file 140, or portion of the notification file 140, associated with that applicable program component 160. In other words, the IDE 150 may display the various messages 210 corresponding to the program component 160 in the notification file 140. In some embodiments, this display occurs in a new window or dialog box that is automatically opened responsive to the selection of the event notification 170. Further, in some embodiments, one or more of the messages 210 displayed from the notification file 140 are selectable. When a user selects a message 210, the IDE 150 may open the code for the program component 160 and may highlight the line at which the event spawning the message 210 occurred. This highlighting may include, for example, applying a particular color to the line, or scrolling down in the code until the line is visible in the window.

As mentioned above, the notification files 140 may be shared among multiple users. In this case, the event notifications 170, which are based on the notification files 140, may also be shared. More specifically, the notification system 100 may display the event notifications 170 to multiple users across multiple devices, and across multiple IDEs.

Notification files 140 may be updated at various times, and because the event notifications 170 are based on the notification files 140, the event notifications 170 in the IDE 150 may be updated as well. In some embodiments, for example, a notification file 140 is updated each time an event is identified in the corresponding program component 160. As a result, a notification file 140 may include messages 210 representing a history of events encountered by the program component 160. In some embodiments, the notification system 100 automatically clears the notification file 140, or portion thereof, and counter associated with a program component 160 when that program component 160 is modified; on a daily basis; or upon manual request for the notifications to be cleared. This clearing may include resetting the counter for the program component 160 to a value of zero and removing all messages 210 in the notification file 140 related to that program component 160. Further, in some embodiments, the notification system 100 is customizable such that the notification files 140 are automatically cleared based on a user's criteria, which may be according to one or more of the above situations.

Figure 3:
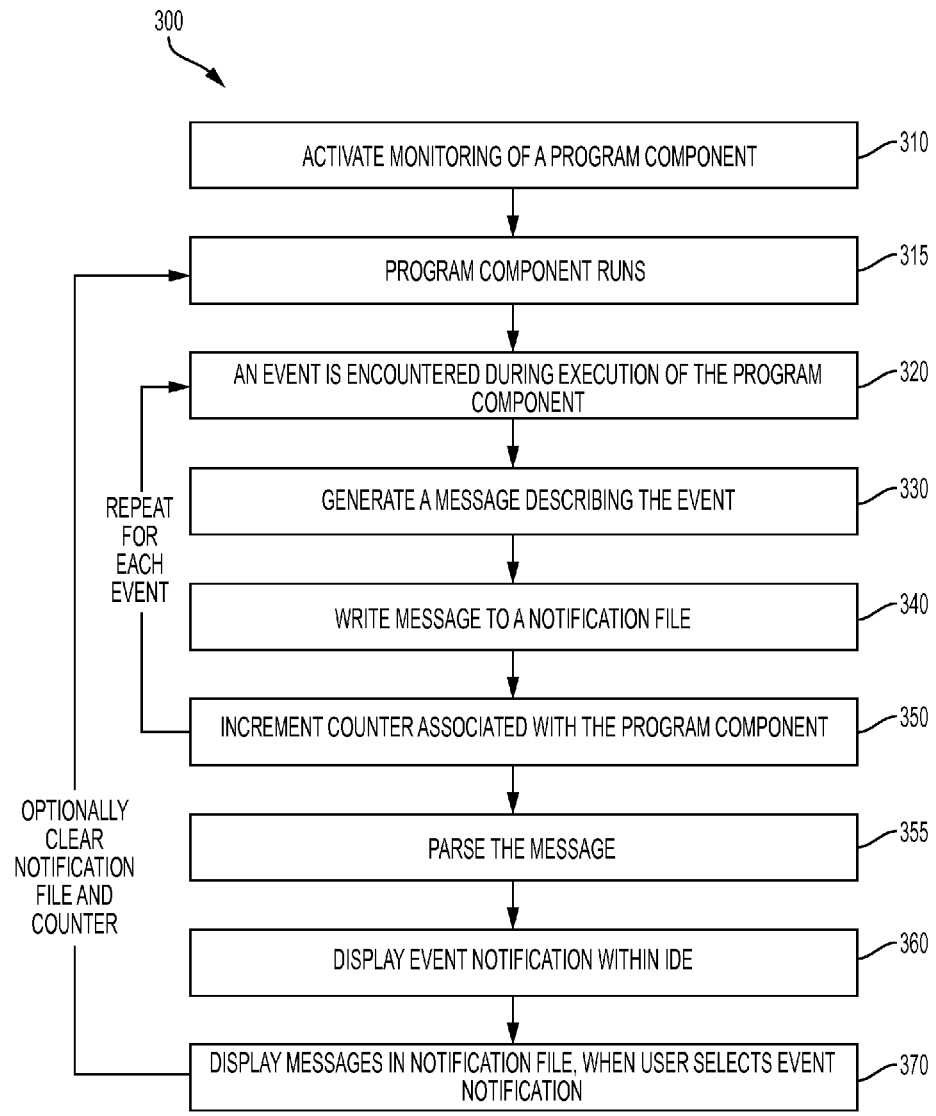
FIG. 3 is a flow diagram of a method for notifying users of messages associated with the execution of program components, according to some embodiments of this disclosure.

FIG. 3 is a flow diagram of a method 300 for notifying a user of events (e.g., exceptions and bugs) in a program component, according to some embodiments of this disclosure. At block 310, monitoring of a program component 160 may be activated. At block 315, the program component 160 runs. At block 320, an event is encountered during execution of the program component 160. At block 330, the monitor 110 may generate a message 210 describing the event. At block 340, the message 210 may be written to a notification file 140 associated with the program component 160. At block 350, a counter associated with the program component 160 may be incremented. Blocks 320 through 350 may repeat for each event encountered throughout the execution of the program component 160. At block 355, the message 210 may be parsed to determine details of the encountered event to display in the IDE. At block 360, an event notification 170 associated with the encountered event may be displayed in association with the program component 160 within an IDE 150. At block 370, when a user selects the event notification 170, the notification system 100 may display one or more messages 210 written to the notification file 140 and describing the events encountered during execution of the program component 160. As discussed above, the notification file 140 and counter may, but need not, be cleared before rerunning the program component at block 315.

FIG. 4 illustrates a block diagram of a computer system 400 for use in implementing a notification system or method according to some embodiments. The notification systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the notification systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Notification systems and methods according to this disclosure may be embodied, in whole or in part, in computer program products or in computer systems 400, such as that illustrated in FIG. 4.

Technical effects and benefits of some embodiments include the ability to display encountered events, such as runtime exceptions and bugs, from within an IDE 150. As a result, developers can conveniently view these events in the same place where development occurs, thus enabling the developers to more easily address these events.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory; and
   one or more computer processors, communicatively coupled to the memory, the one or more computer processors configured to:
   select one or more program components to be monitored from among a plurality of program components, wherein the selecting is based on activation by a user;
   associate a respective counter with each program component of the one or more program components selected to be monitored;
   monitor one or more data sources responsive to a first execution of the one or more program components;
   encounter one or more events in the one or more data sources resulting from the first execution of the one or more program components during the first execution of the one or more program components;
   generate one or more messages in one or more notification files, each message describing a respective event encountered during the first execution and related to a program component of the one or more program components, responsive to encountering the one or more events in the one or more data sources; and increment the respective counter associated with each program component of the one or more program components, for each message generated describing a respective event encountered related to the program component;

notify of the one or more messages within an integrated development environment (IDE), each of the one or more messages associated in the IDE with a corresponding source file at the corresponding line number, wherein the notifying of the one or more messages within the IDE comprises:

parsing each of the one or more messages for a name of the corresponding source file in which the associated event was encountered, a corresponding line number at which the associated event was encountered, and a full stack trace of the event;

displaying a respective event notification in the IDE associated with each program component, of the one or more program components, having a respective counter with a value greater than zero, wherein the respective event notification associated with a program component is sized based on the value of the respective counter of the program component; and displaying the full stack trace of the event within the IDE in association with the corresponding line number of the corresponding source file;

wherein the one or more messages notified of within the IDE are related to the one or more program components selected from the plurality of program components.

2. The system of claim 1, further comprising:

monitor the one or more data sources responsive to a second execution of the one or more program components;

encounter one or more additional events in the one or more data sources resulting from the second execution of the one or more program components during the second execution of the one or more program components;

generate one or more additional messages in the one or more notification files, wherein the one or more additional messages are added to the one or more messages in the one or more notification files, each additional message describing a respective additional event encountered during the second execution and related to a program component of the one or more program components, responsive to encountering the one or more additional events in the one or more data sources; and notify of the one or more messages from the first execution along with the one or more additional messages from the second execution within the IDE, wherein notifications within the IDE are based on a history of a plurality of executions of the one or more program components.

3. The system of claim 1, wherein the one or more computer processors are further configured to:

clear the one or more notification files responsive to a set of criteria being met;

wherein the one or more messages are cleared from the IDE, responsive to clearing the one or more notification files.

4. The system of claim 1, wherein the one or more computer processors are further configured to:

receive a user selection of a first event notification displayed in the IDE associated with a first program component of the one or more program components;

display in the IDE a first message associated with the first program component, responsive to the user selection of the first event notification;

receive a user selection of the first message associated with the first program component; and open first source code for the first program component and highlight a line at which an event associated with the first message occurs in the first source code, responsive to the user selection of the first message.

5. The system of claim 1, wherein the one or more messages are shared across two or more IDEs of two or more computing devices.

6. A computer program product for notifying of events encountered in program components, the computer program product comprising a computer readable storage medium having program instructions embodied therewith, the program instructions executable by a processor to cause the processor to perform a method comprising:

selecting one or more program components to be monitored from among a plurality of program components, wherein the selecting is based on activation by a user;

associating a respective counter with each program component of the one or more program components selected to be monitored;

monitoring one or more data sources responsive to a first execution of one or more program components;

encountering one or more events in the one or more data sources resulting from the first execution of the one or more program components during the first execution of the one or more program components;

generating one or more messages in one or more notification files, each message describing a respective event encountered during the first execution and related to a program component of the one or more program components, responsive to encountering the one or more events in the one or more data sources; and incrementing the respective counter associated with each program component of the one or more program components, for each message generated describing a respective event encountered related to the program component;

notifying of the one or more messages within an integrated development environment (IDE), each of the one or more messages associated in the IDE with the corresponding source file at the corresponding line number, wherein the notifying of the one or more messages within the IDE comprises:

parsing each of the one or more messages for a name of the corresponding source file in which the associated event was encountered, a corresponding line number at which the associated event was encountered, and a full stack trace of the event;

displaying a respective event notification in the IDE associated with each program component, of the one or more program components, having a respective counter with a value greater than zero, wherein the respective event notification associated with a program component is sized based on the value of the respective counter of the program component; and displaying the full stack trace of the event within the IDE in association with the corresponding line number of the corresponding source file;

wherein the one or more messages notified of within the IDE are related to the one or more program components selected from the plurality of program components.

7. The computer program product of claim 6, the method further comprising:
monitoring the one or more data sources responsive to a second execution of the one or more program components;
encountering one or more additional events in the one or more data sources resulting from the second execution of the one or more program components during the second execution of the one or more program components;
generating one or more additional messages in the one or more notification files, wherein the one or more additional messages are added to the one or more messages in the one or more notification files, each additional message describing a respective additional event encountered during the second execution and related to a program component of the one or more program components, responsive to encountering the one or more additional events in the one or more data sources; and
notifying of the one or more messages from the first execution along with the one or more additional messages from the second execution within the IDE, wherein notifications within the IDE are based on a history of a plurality of executions of the one or more program components.

8. The computer program product of claim 6, wherein the one or more messages are shared across two or more IDEs of two or more computing devices.

9. The computer program product of claim 6, the method further comprising:
clearing the one or more notification files responsive to a set of criteria being met;
wherein the one or more messages are cleared from the IDE, responsive to clearing the one or more notification files.

10. The computer program product of claim 6, the method further comprising:
receiving a user selection of a first event notification displayed in the IDE associated with a first program component of the one or more program components;
displaying in the IDE a first message associated with the first program component, responsive to the user selection of the first event notification;
receiving a user selection of the first message associated with the first program component; and
opening first source code for the first program component and highlight a line at which an event associated with the first message occurs in the first source code, responsive to the user selection of the first message.

* * * * *